United States Patent
Xu et al.

(10) Patent No.: US 12,098,632 B2
(45) Date of Patent: Sep. 24, 2024

(54) SYSTEM AND METHOD FOR WELL LOG REPEATABILITY VERIFICATION

(71) Applicant: ARAMCO SERVICES COMPANY, Houston, TX (US)

(72) Inventors: Chicheng Xu, Houston, TX (US); Mohamed Larbi Zeghlache, Al Khobar (SA); Tao Lin, Katy, TX (US); Yuchen Jin, Houston, TX (US); Weichang Li, Katy, TX (US); Olanrewaju Abudu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 223 days.

(21) Appl. No.: 17/814,449

(22) Filed: Jul. 22, 2022

(65) Prior Publication Data
US 2024/0026785 A1    Jan. 25, 2024

(51) Int. Cl.
E21B 49/00     (2006.01)
(52) U.S. Cl.
CPC .................................. E21B 49/003 (2013.01)
(58) Field of Classification Search
CPC ......... E21B 49/003; E21B 47/04; G01V 1/50; G01V 2200/14
See application file for complete search history.

(56) References Cited

U.S. PATENT DOCUMENTS

| | | | |
|---|---|---|---|
| 4,393,486 A | 7/1983 | Thompson et al. | |
| 6,675,101 B1 | 1/2004 | Shray et al. | |
| 7,277,796 B2 | 10/2007 | Kuchuk et al. | |
| 8,204,692 B2 | 6/2012 | Arango et al. | |
| 8,457,898 B2 | 6/2013 | Hartmann et al. | |
| 8,505,625 B2 | 8/2013 | Ravi et al. | |

(Continued)

FOREIGN PATENT DOCUMENTS

| | | |
|---|---|---|
| CA | 3 070 868 C | 10/2022 |
| CN | 101976494 B | 6/2013 |

(Continued)

OTHER PUBLICATIONS

Theys, Philippe P. "A serious look at repeat sections." In SPWLA Annual Logging Symposium, pp. SPWLA-1994. SPWLA, 1994 (Year: 1994).*

(Continued)

*Primary Examiner* — Douglas Kay
(74) *Attorney, Agent, or Firm* — Osha Bergman Watanabe & Burton LLP

(57) ABSTRACT

A method to perform a field operation with well log repeatability verification is disclosed. The method includes generating, by repeatedly performing well logging of a wellbore penetrating a subterranean formation in a field, a set of well log data files each comprising a plurality of data channels, each data channel comprising a series of measurement data records representing a downhole property along a depth in the wellbore, analyzing, by a computer processor, a main log and a repeat log of the set of well log data files to determine a repeatability measure of the set of well log data files, presenting, using a graphical user interface, the repeatability measure to a user, and facilitating, based on a user input in response to presenting the repeatability measure, the field operation.

17 Claims, 6 Drawing Sheets

(56) References Cited

U.S. PATENT DOCUMENTS

| | | | |
|---|---|---|---|
| 9,651,699 B2 | 5/2017 | Snow et al. | |
| 9,939,548 B2 | 4/2018 | Burmester et al. | |
| 9,957,780 B2 | 5/2018 | Knecht et al. | |
| 10,067,973 B2 | 9/2018 | Moore | |
| 10,353,111 B2 | 7/2019 | Sanstrom et al. | |
| 10,551,522 B2 | 2/2020 | Donderici et al. | |
| 10,996,372 B2 | 5/2021 | Denli et al. | |
| 11,003,952 B2 | 5/2021 | Feng et al. | |
| 2003/0074139 A1* | 4/2003 | Poedjono | G01V 1/44 702/16 |
| 2006/0136461 A1 | 6/2006 | Lee et al. | |
| 2008/0133137 A1 | 6/2008 | Tatro | |
| 2009/0037111 A1 | 2/2009 | Radtke et al. | |
| 2009/0268589 A1* | 10/2009 | Nakano | G11B 7/1267 |
| 2010/0312477 A1 | 12/2010 | Sanstrom et al. | |
| 2012/0144325 A1 | 6/2012 | Mital et al. | |
| 2015/0316678 A1 | 11/2015 | Pereira et al. | |
| 2016/0358120 A1 | 12/2016 | Moore et al. | |
| 2017/0206289 A1 | 7/2017 | Schoen et al. | |
| 2017/0220938 A1 | 8/2017 | Sainani et al. | |
| 2017/0248736 A1 | 8/2017 | Banas | |
| 2018/0038992 A1 | 2/2018 | Macdonald et al. | |
| 2018/0298746 A1 | 10/2018 | Short et al. | |
| 2018/0348395 A1 | 12/2018 | Wilson et al. | |
| 2019/0034812 A1 | 1/2019 | Borrel et al. | |
| 2019/0064383 A1 | 2/2019 | Song et al. | |
| 2019/0106982 A1 | 4/2019 | Willerth et al. | |
| 2019/0318021 A1 | 10/2019 | Hiu et al. | |
| 2020/0165910 A1 | 5/2020 | Andresen et al. | |
| 2020/0372057 A1 | 11/2020 | Tonkin et al. | |
| 2020/0378239 A1 | 12/2020 | Jones et al. | |
| 2020/0378248 A1 | 12/2020 | Maus et al. | |
| 2021/0123343 A1 | 4/2021 | Zhou et al. | |
| 2021/0181370 A1 | 6/2021 | Zimmermann et al. | |
| 2021/0199831 A1 | 7/2021 | Lunny | |
| 2021/0240680 A1 | 8/2021 | Scholak et al. | |
| 2021/0254457 A1 | 8/2021 | Anifowose et al. | |
| 2022/0043179 A1 | 2/2022 | Ghosh et al. | |
| 2022/0268148 A1 | 8/2022 | Fulton et al. | |
| 2022/0292338 A1 | 9/2022 | Nair et al. | |
| 2022/0365913 A1 | 11/2022 | Zeghlache | |
| 2023/0032044 A1 | 2/2023 | Li et al. | |
| 2023/0041525 A1 | 2/2023 | Hong et al. | |
| 2023/0259798 A1 | 8/2023 | Modugula et al. | |

FOREIGN PATENT DOCUMENTS

| | | |
|---|---|---|
| CN | 106918847 A | 7/2017 |
| CN | 104881435 B | 5/2018 |
| CN | 111472751 B | 11/2020 |
| CN | 112000650 A | 11/2020 |
| CN | 112859183 A | 5/2021 |
| CN | 115267935 A | 11/2022 |
| CN | 115630564 A | 1/2023 |
| EP | 2126807 A1 | 12/2009 |
| EP | 2 893 406 B1 | 10/2018 |
| EP | 3 978 961 A1 | 4/2022 |
| WO | 2013/122971 A2 | 8/2013 |
| WO | 2018027089 A1 | 2/2018 |
| WO | 2018/182691 A1 | 10/2018 |
| WO | 2018/208634 A1 | 11/2018 |
| WO | 2019241062 A1 | 12/2019 |
| WO | 2020/065365 A1 | 4/2020 |
| WO | 2020/065374 A1 | 4/2020 |
| WO | 2021046366 A1 | 3/2021 |
| WO | 2022/005937 A1 | 1/2022 |

OTHER PUBLICATIONS

Theys, Philippe, and et al. "Current status of well logging data deliverables and a vision forward." In SPWLA Annual Logging Symposium, pp. SPWLA-2014. SPWLA, 2014 (Year: 2014).*

Fang, J. H., H. C. Chen, A. W. Shultz, and W. Mahmoud. "Computer-aided well log correlation (1)." AAPG bulletin 76, No. 3 (1992): 307-317 (Year: 1992).*

Office Action issued Sep. 14, 2022 in U.S. Appl. No. 17/321,170.

Wu, Po-Yen et al., "Machine learning-based method for automated well log processing and interpretation"; SEG Technical Program Expanded Abstracts 2018; pp. 2041-2045; Aug. 27, 2018 (5 pages).

Singh, Harpreet et al., "Automated Well-Log Processing and Lithology Classification by Identifying Optimal Features Through Unsupervised and Supervised Machine-Learning Algorithms"; SPE Journal; vol. 25, Issue 5, Paper No. SPE-202477-PA; pp. 1-23; Oct. 2020 (23 pages).

Oberwinker, Christian et al., "Automated Production Surveillance"; SPE Projects, Facilities & Construction; vol. 1, Issue 2, Paper No. SPE-96645-PA; pp. 1-8; Jun. 2006 (8 pages).

Xu, Chicheng et al., "When Petrophysics Meets Big Data: What can Machine Do?"; Proceedings of the SPE Middle East Oil and Gas Show and Conference; Paper No. SPE-195068-MS; pp. 1-25; Mar. 18-21, 2019 (25 pages).

Pankaj, Purohit et al., "Preserving and Securing Legacy Well Log Data"; Proceedings of the Abu Dhabi International Petroleum Exhibition & Conference; Paper No. SPE-188475-MS; pp. 1-13; Nov. 13-16, 2017 (13 pages).

Le Nir, I. et al., "Cross-Section Construction From Automated Well Log Correlation: A Dynamic Programming Approach Using Multiple Well Logs"; Proceedings of the SPWLA 39th Annual Logging Symposium; Paper No. SPWLA-1998-DDD; pp. 1-13; May 26-28, 1998 (13 pages).

Viggen, Erlend Magnus et al., "Automatic interpretation of cement evaluation logs from cased boreholes using supervised deep neural networks"; Journal of Petroleum Science and Engineering; vol. 195, Article 107539; pp. 1-17; Dec. 2020 (17 pages).

Non-Final Office Action issued in corresponding U.S. Appl. No. 17/814,447, mailed Sep. 14, 2023 (29 pages).

Zeghlache, Mohamed Larbi et al., "Automated Corrosion Log Quality Control and Interpretation Using Machine-Learning"; Proceedings of the Offshore Technology Conference Asia; Paper No. OTC-31631-MS; pp. 1-14; Mar. 18, 2022 (14 pages).

Guo, Rui et al., "Physics Embedded Machine Learning for Electromagnetic Data Imaging"; Computational Physics; arXiv:2207.12607v1; pp. 1-25; Jul. 26, 2022 (25 pages).

Belozerov, Boris et al., "Automatic Well Log Analysis Across Priobskoe Field Using Machine Learning Methods"; Proceedings of the SPE Russian Petroleum Technology Conference; Paper No. SPE-191604-18RPTC-MS; pp. 1-21; Oct. 15, 2018 (21 pages).

Fang, Chunfei et al., "A Novel Cementing Quality Evaluation Method Based on Convolutional Neural Network"; Applied Sciences; vol. 12, Issue 21, Article 10997; pp. 1-15; Nov. 2022 (15 pages).

Tsanda, A. et al., "Well logging verification using machine learning algorithms"; 2018 International Conference on Artificial Intelligence Applications and Innovations (IC-AIAI); pp. 75-77; 2018 (3 pages).

Harmon, "What is Data Integrity", Published: Nov. 20, 2020, https://www.technologynetworks.com/informatics/articles/what-is-data-integrity-343068, Hereinadter "Harmon" (Year: 2020).

Esrafili-Dizaji, Quick look log analysis, Sep. 2021, Researchgate.net, p. 1, https://www.researchgate.net/publication/354378960_Quick_look_log_analysis (Year: 2021).

T. Cornet et al., BepiColombo Data Analysis Ecosystem: Quick-Look and Science Analysis Forum, 2021, USRA-Houston, p. 1, https://www.hou.usra.edu/meetings/planetdata2021/eposter/7033.pdf (Year: 2021).

M. C. Storey; "Demystifying Log Quality Control", SPE-182313-MS; Society of Petroleum Engineers; Oct. 25, 2016; pp. 1-24 (24 pages).

Gutman et al.; "Reservoir Modeling—Automatic Well Log Data Correlation Using 'AutoCorr' Software", SPE-104343; Society of Petroleum Engineers; Oct. 3, 2006; pp. 1-7 (7 pages).

* cited by examiner

SYSTEM AND METHOD FOR WELL LOG REPEATABILITY VERIFICATION

BACKGROUND

The term "well log" refers to measurement versus depth of physical properties in or around a well. The term comes from the word "log" used in the sense of a record or a note. Wireline logs are obtained downhole and transmitted through a wireline to surface and recorded. Similarly, measurements-while-drilling (MWD) and logging while drilling (LWD) logs are also obtained downhole. Well logs are either transmitted to surface by mud pulses, or recorded downhole and retrieved later when the logging instrument is brought to surface. Mud logs that describe samples of drilled cuttings are taken and recorded on surface.

SUMMARY

In general, in one aspect, the invention relates to a method to perform a field operation with well log repeatability verification. The method includes generating, by repeatedly performing well logging of a wellbore penetrating a subterranean formation in a field, a set of well log data files each comprising a plurality of data channels, each data channel comprising a series of measurement data records representing a downhole property along a depth in the wellbore, analyzing, by a computer processor, a main log and a repeat log of the set of well log data files to determine a repeatability measure of the set of well log data files, presenting, using a graphical user interface, the repeatability measure to a user, and facilitating, based on a user input in response to presenting the repeatability measure, the field operation.

In general, in one aspect, the invention relates to a data gathering and analysis system. The data gathering and analysis system includes a computer processor and memory storing instructions, when executed, causing the computer processor to generate, by repeatedly performing well logging of a wellbore penetrating a subterranean formation in a field, a set of well log data files each comprising a plurality of data channels, each data channel comprising a series of measurement data records representing a downhole property along a depth in the wellbore, analyze a main log and a repeat log of the set of well log data files to determine a repeatability measure of the set of well log data files, present, using a graphical user interface, the repeatability measure to a user, and facilitate, based on a user input in response to presenting the repeatability measure, the field operation.

In general, in one aspect, the invention relates to a system. The system includes a wellsite having a wellbore penetrating a subterranean formation in a field, and a data gathering and analysis system comprising functionality for generating, by repeatedly performing well logging of a wellbore penetrating a subterranean formation in a field, a set of well log data files each comprising a plurality of data channels, each data channel comprising a series of measurement data records representing a downhole property along a depth in the wellbore, analyzing, by a computer processor, a main log and a repeat log of the set of well log data files to determine a repeatability measure of the set of well log data files, presenting, using a graphical user interface, the repeatability measure to a user, and facilitating, based on a user input in response to presenting the repeatability measure, the field operation.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (for example, first, second, third) may be used as an adjective for an element (that is, any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for performing a field operation as facilitated by well log repeatability verification. The field operation refers to physical activities performed in an oil and gas field. By performing well logging of a wellbore penetrating a subterranean formation in a field, a well log data file is generated that includes a large number of data channels, each data channel having a series of measurement data records representing a downhole property (e.g., irradiation, density, electrical and acoustic properties, etc.) along a depth in the wellbore. Using a computer processor, a main log and a repeat log from repeatedly performed well loggings are analyzed to generate a repeatability summary report that includes a repeatability measure of the set of well log data files. The repeatability summary report is presented using a graphical user interface (GUI) to a user. The field operation (e.g., well production operation, well drilling operation, well completion operation, well maintenance operation, reservoir monitoring, assessment and development operation, etc.) is then advantageously performed based on a user input in response to presenting the verification summary.

Figure 1A:
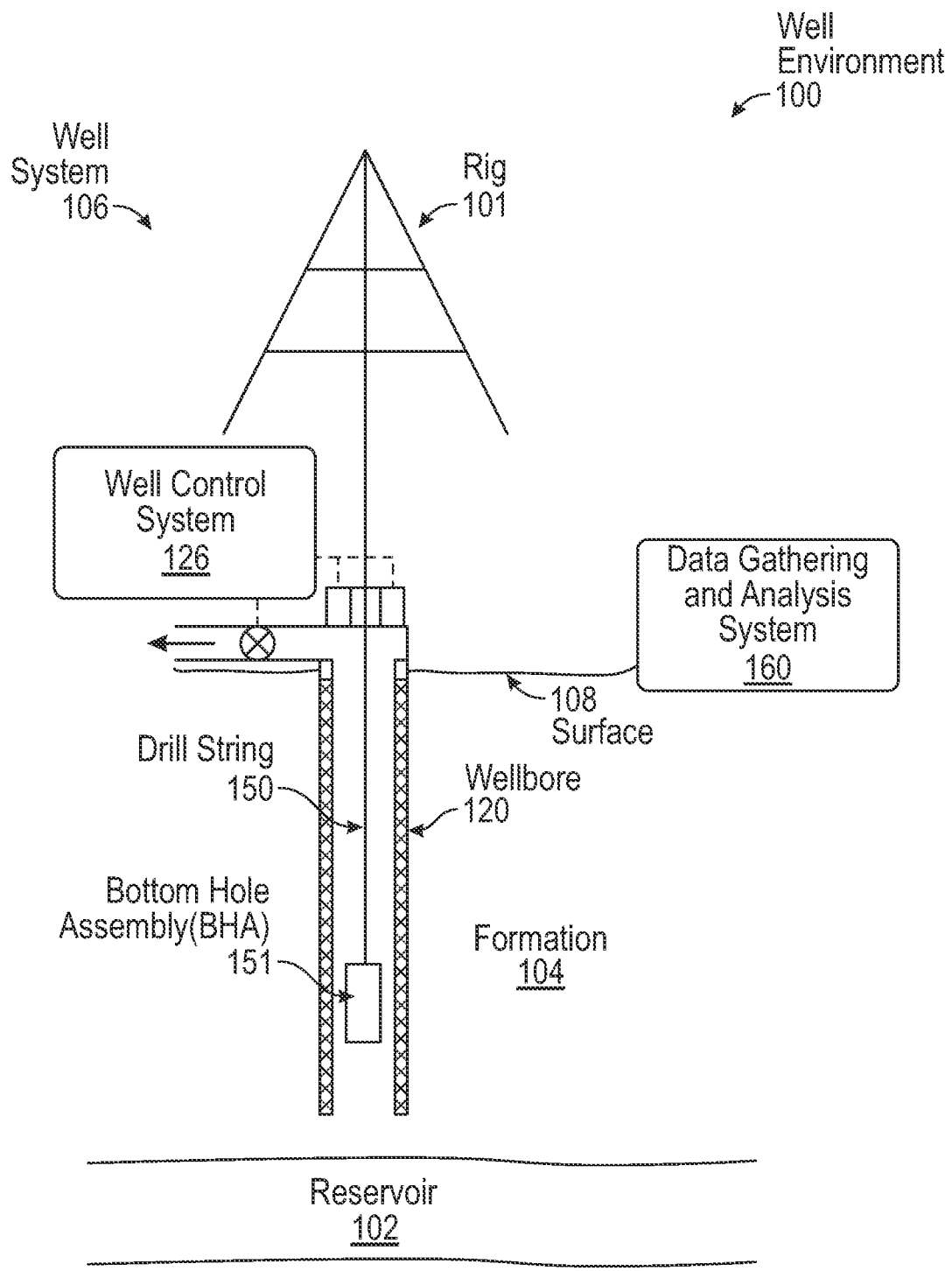
FIGS. 1A-1B show a system in accordance with one or more embodiments.

FIG. 1A shows a schematic diagram of a well environment in accordance with one or more embodiments. In one or more embodiments, one or more of the modules and/or elements shown in FIG. 1A may be omitted, repeated, and/or substituted. Accordingly, embodiments disclosed herein should not be considered limited to the specific arrangements of modules and/or elements shown in FIG. 1A.

As shown in FIG. 1A, a well environment (100) includes a subterranean formation ("formation") (104) and a well system (106). The formation (104) may include a porous or fractured rock formation that resides underground, beneath the earth's surface ("surface") (108). The formation (104) may include different layers of rock having varying characteristics, such as varying degrees of permeability, porosity, capillary pressure, and resistivity. In the case of the well system (106) being a hydrocarbon well, the formation (104) may include a hydrocarbon-bearing reservoir (102). In the case of the well system (106) being operated as a production well, the well system (106) may facilitate the extraction of hydrocarbons (or "production") from the reservoir (102).

In some embodiments disclosed herein, the well system (106) includes a rig (101), a wellbore (120), a data gathering and analysis system (160), and a well control system ("control system") (126). The well control system (126) may control various operations of the well system (106), such as well production operations, well drilling operation, well completion operations, well maintenance operations, and reservoir monitoring, assessment and development operations. In some embodiments, the well control system (126) includes a computer system.

The rig (101) is the machine used to drill a borehole to form the wellbore (120). Major components of the rig (101) include the drilling fluid tanks, the drilling fluid pumps (e.g., rig mixing pumps), the derrick or mast, the draw works, the rotary table or top drive, the drill string, the power generation equipment and auxiliary equipment. Drilling fluid, also referred to as "drilling mud" or simply "mud," is used to facilitate drilling boreholes into the earth, such as drilling oil and natural gas wells.

In some embodiments, a bottom hole assembly (BHA) (151) is attached to the drill string (150) to suspend into the wellbore (120) for performing the well drilling operation. The bottom hole assembly (BHA) is the lowest part of the drill string (150) and includes the drill bit, drill collar, stabilizer, mud motor, etc.

The wellbore (120) includes a bored hole (i.e., borehole) that extends from the surface (108) towards a target zone of the formation (104), such as the reservoir (102). The wellbore (120) may be drilled for exploration, development and production purposes. The wellbore (120) may facilitate the circulation of drilling fluids during drilling operations for the wellbore (120) to extend towards the target zone of the formation (104) (e.g., the reservoir (102)), facilitate the flow of hydrocarbon production (e.g., oil and gas) from the reservoir (102) to the surface (108) during production operations, facilitate the injection of substances (e.g., water) into the hydrocarbon-bearing formation (104) or the reservoir (102) during injection operations, or facilitate the communication of logging tools lowered into the formation (104) or the reservoir (102) during logging operations. The wellbore (120) may be logged by lowering a combination of physical sensors downhole to acquire data that measures various rock and fluid properties, such as irradiation, density, electrical and acoustic properties. The acquired data may be organized in a log format and referred to as well logs or well log data.

In some embodiments, the data gathering and analysis system (160) includes hardware and/or software with functionality for facilitating operations of the well system (106), such as well production operations, well drilling operation, well completion operations, well maintenance operations, and reservoir monitoring, assessment and development operations. For example, the data gathering and analysis system (160) may store drilling data records of drilling the wellbore (120) and well log data records of logging the wellbore (120). The data gathering and analysis system (160) may validate and analyze the well log data records to generate recommendations to facilitate various operations of the well system (106). In particular, the well log data records are validated before analysis. Once validated, a reservoir simulator may be used to further analyze the validated well log data and/or other types of data to generate and/or update reservoir models. The verification aspect of the data gathering and analysis system (160) is referred to as a well log verification system. While the data gathering and analysis system (160) is shown at a well site, embodiments are contemplated where at least a portion of the data gathering and analysis system (160) is located away from well sites. In some embodiments, the data gathering and analysis system (160) may include a computer system that is similar to the computer system (400) described below with regard to FIG. 4 and the accompanying description.

Figure 1B:
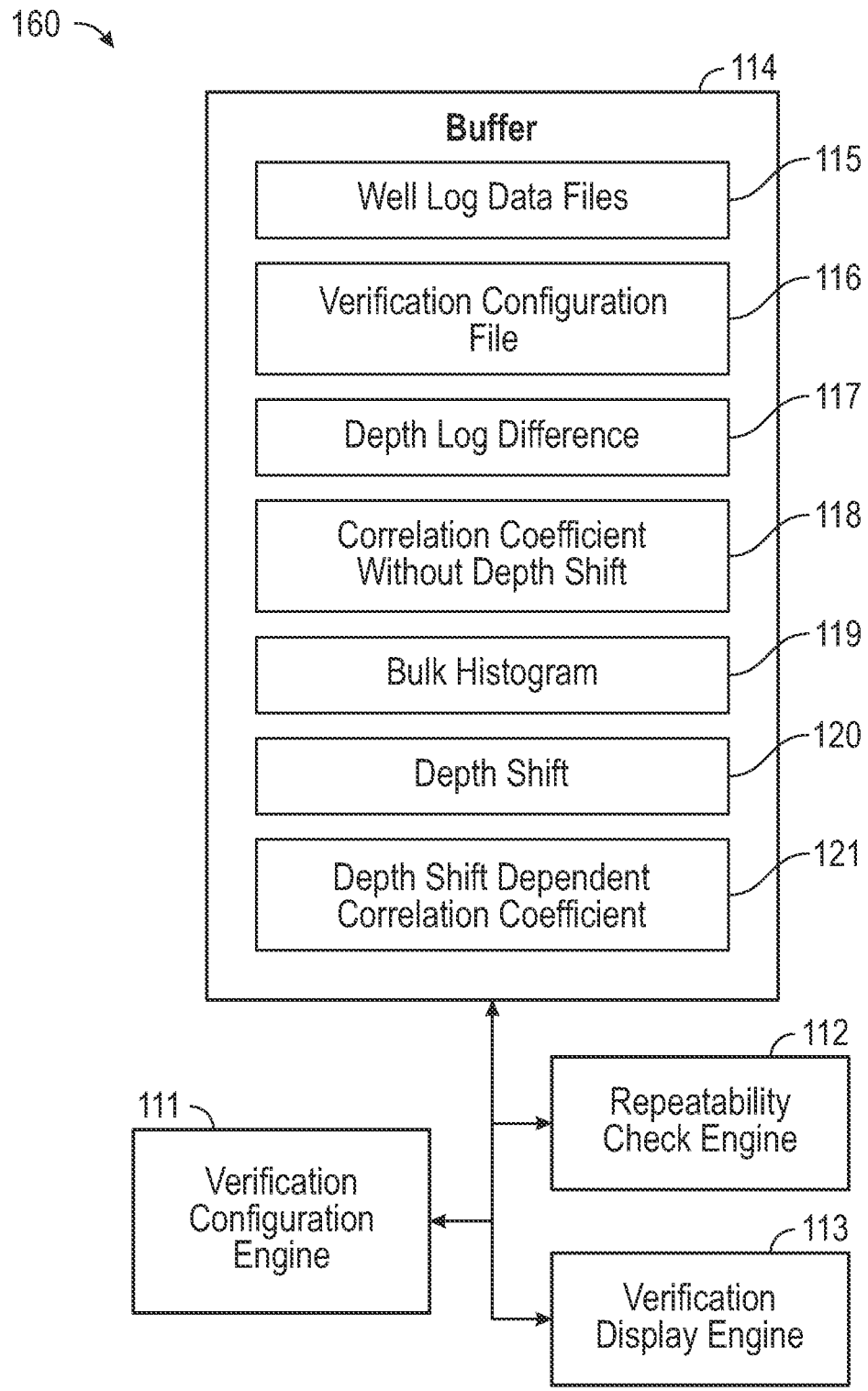

FIG. 1B shows details of the data gathering and analysis system (160) depicted in FIG. 1A above, in accordance with one or more embodiments disclosed herein. In one or more embodiments, one or more of the modules and/or elements shown in FIG. 1B may be omitted, repeated, and/or substituted. Accordingly, embodiments disclosed herein should not be considered limited to the specific arrangements of modules and/or elements shown in FIG. 1B.

As shown in FIG. 1B, the data gathering and analysis system (160) has multiple components, including, for example, a buffer (114), a verification configuration engine (111), a repeatability check engine (112), and a verification display engine (113). Each of these components is discussed below.

In one or more embodiments, the buffer (114) may be implemented in hardware (i.e., circuitry), software, or any combination thereof. The buffer (114) may be any data structure configured to store input data, output results, and intermediate data of the verification configuration engine (111), the repeatability check engine (112), and the verification display engine (113). In one or more embodiments, the buffer (114) stores well log data files (115), a verification configuration file (116), depth log difference (117), correlation coefficient without depth shift (118), a bulk histogram (119), depth shift (120), and depth shift dependent correlation coefficient (121).

The well log data files (115) include wireline logs, MWD logs, LWD logs, mud logs, etc. of one or more wells in a field. Each wireline log, MWD log, LWD log, mud log, etc. may be repeated multiple times under same downhole conditions to verify repeatability associated with, e.g., wellbore environment, sensor noise, measurement instrument, etc. In one or more embodiments, within the multiple logs, the initial log is referred to as the main log and one or more subsequent log(s) are referred to as repeat log(s). Because the repeat log may not be an exact copy of the main log due to sensor noise and/or measurement instrument reliability, etc., wireline logs are often acquired in a repeat pass along a short interval (e.g., a depth interval of 100 m or several hundred feet) to validate the main run data and to make sure the log response is repeatable under same downhole conditions. This is a quality control over the tool functionality and reliability to generate repeatable log. That is, how well a log can be repeated or reproduced along this short interval is often used as important criteria for data quality, especially across zones with special response, known response, log anomaly, etc. In one or more embodiments, the degree of how well a log can be repeated or reproduced under same downhole conditions is measured by a correlation coefficient and associated statistic parameters between the main log and the repeat log. The correlation coefficient and associated statistical parameters are referred to as a repeatability measure, which may be limited by the downhole tool functionality and reliability. In one or more embodiments, the well log data files (115) are archived in DLIS (Digital Log Information Standard) or LAS (Log ASCII Standard) files as deliverables from a logging service provider to an operating entity of the field, such as a drilling company, an oil/gas production company, etc. generally referred to as the operating company.

The verification configuration file (116) is a configuration file that specifies various criteria for determining repeatability of the well log data files. In one or more embodiments, the criteria describe PASS/FAIL conditions for a strict test of repeatability. The strict test of repeatability is a test that determines repeatability by comparing main log and repeat log without taking into account any depth shift adjustment. In addition, the criteria further describe PASS/FAIL conditions for a lenient test of repeatability. The lenient test of repeatability is a test that determines repeatability by comparing main log and repeat log while taking into account the effect of depth shift adjustments.

The depth log difference (117) is a log of computed differences between the main log and a repeat log. In one or more embodiments, the depth log difference (117) includes percentage difference values versus the depth along the wellbore.

The correlation coefficient without depth shift (118) is a measure that quantifies the strength of a linear relationship between the main log and a repeat log. The measure is computed based on corresponding measurement values in the main log and one or more repeat logs without adjusting any depth values in the main log and repeat log.

The bulk histogram (119) is a set of histograms of the main log and the repeat log(s). For example, the bulk histogram (119) may include a histogram of the main log superimposed over a histogram of the repeat log. Both mean values and standard deviations are compared to check log repeatability.

The depth shift (120) is an adjustment to offset the depth scale of the main log with respect to a repeat log. For example, the adjustment may correspond to an alignment error of depth measurements between the main log and the repeat log due to calibration or other instrumentation issues.

The depth shift dependent correlation coefficient (121) is the computed correlation coefficient versus a variable value of the depth shift (120). Specifically, the depth shift dependent correlation coefficient (121) is computed with a variable offset in the depth scales of the main log and the repeat log. Specifically, the depth scales of the main log and the repeat log are offset by the variable values of the depth shift (120).

In one or more embodiments, the verification configuration engine (111) may be implemented in hardware (i.e., circuitry), software, or any combination thereof. The verification configuration engine (111) is configured to generate, select, and/or revise the verification configuration file (116) based on user input. For example, the user input may be received via a graphical user interface (GUI), more specifically via selection or data entry fields of the GUI.

In one or more embodiments, the repeatability check engine (112) may be implemented in hardware (i.e., circuitry), software, or any combination thereof. The repeatability check engine (112) is configured to analyze the well log data files (115) to perform a strict test of repeatability and a lenient test of repeatability based on respective correlation analyses of the main log and the repeat log. Strict test refers to a test without any depth adjustments in the logs, while the lenient test allows depth adjustments to improve the correlation between the adjusted logs. The strict test vs. the lenient test are discussed further in FIG. 2 below.

In one or more embodiments, the verification display engine (113) may be implemented in hardware (i.e., circuitry), software, or any combination thereof. The verification display engine (113) is configured to display the results of the strict test of repeatability and the lenient test of repeatability. For example, results of the strict test of repeatability and the lenient test of repeatability may be displayed via a GUI to the user.

In one or more embodiments, the verification configuration engine (111), the repeatability check engine (112), and the verification display engine (113) collectively perform the functionalities described above using the method described in reference to FIG. 2 below.

Although the data gathering and analysis system (160) is shown as having four components (111, 112, 113, 114), in other embodiments, the data gathering and analysis system (160) may have more or fewer components. Further, the functionality of each component described above may be split across multiple components. Further still, each component (111, 112, 113, 114) may be utilized multiple times to carry out an iterative operation.

Figure 2:
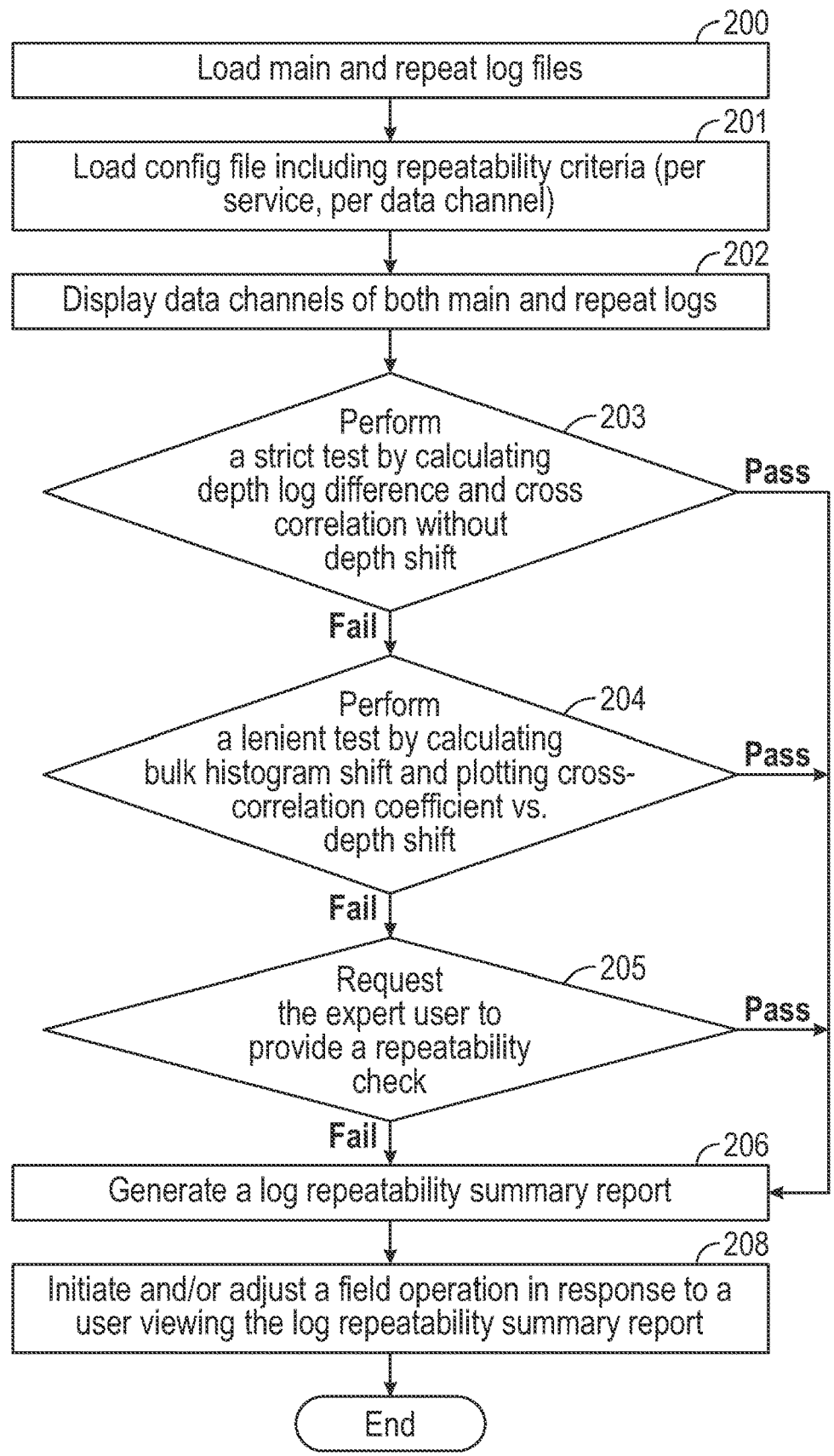
FIG. 2 shows a method flowchart in accordance with one or more embodiments.

FIG. 2 shows a flowchart in accordance with one or more embodiments disclosed herein. One or more of the steps in FIG. 2 may be performed by the components of the well environment (100), in particular the data gathering and analysis system (160), discussed above in reference to FIGS. 1A-1B. In one or more embodiments, one or more of the steps shown in FIG. 2 may be omitted, repeated, and/or performed in a different order than the order shown in FIG. 2. Accordingly, the scope of the disclosure should not be considered limited to the specific arrangement of steps shown in FIG. 2.

Referring to FIG. 2, initially in Step 200, well log data files are loaded into a data gathering and analysis system. Each log data file may be a single compressed file containing a large number of data channels arranged in DLIS, LAS, LIS, or other suitable formats. The well log data files include one or more sets of main logs and repeat logs of a well. The well log data files to be loaded may be located in a local folder of the data gathering and analysis system or retrieved from a remote data server. Previously loaded well log data file cache may also be removed (i.e., flushed) or updated.

In Step 201, a verification configuration file is loaded into the data gathering and analysis system. The verification configuration file contains a set of rules and criteria for determining whether each set of repeat and main logs is repeatable or not. The repeatability may be determined on a per service (i.e., based on all data channels in the well log data files) or per data channel basis. The verification configuration file to be loaded may be located in a local folder of the data gathering and analysis system or retrieved from a remote data server. Previously loaded configuration file cache may also be removed (i.e., flushed) or updated.

Figure 3B:
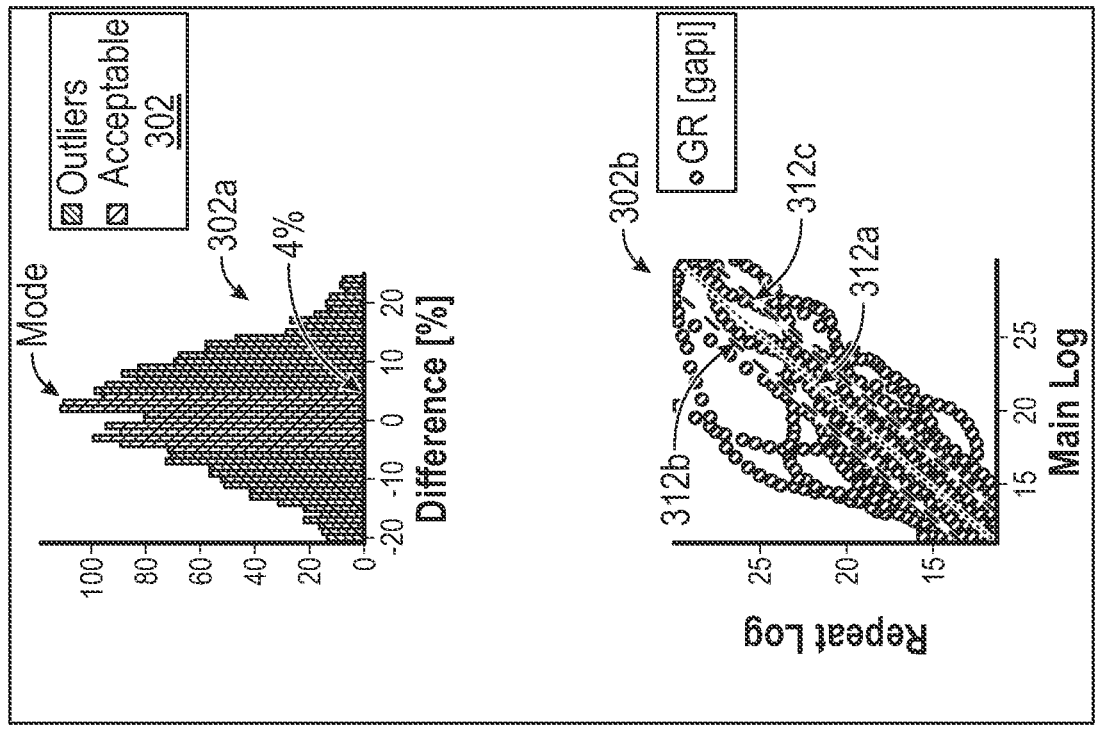
FIGS. 3A-3C show an example in accordance with one or more embodiments.
Figure 3A:
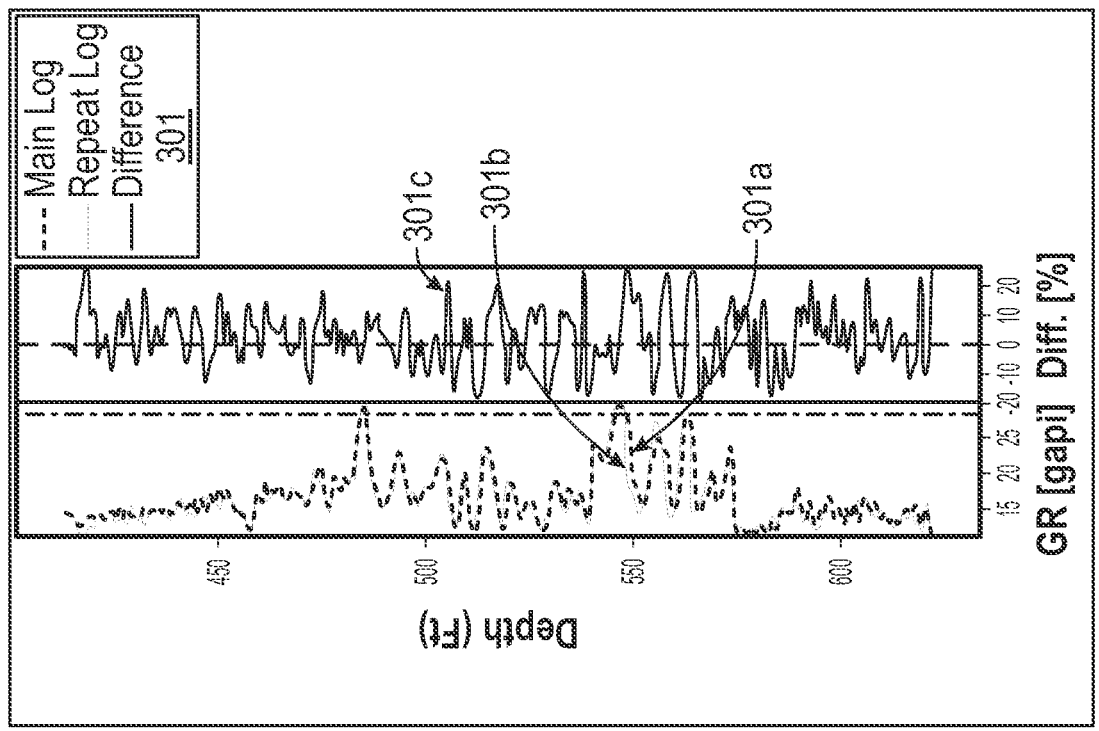

In Step 202, data channels of both main and repeat logs of each set of logs are displayed for user visualization. In one or more embodiments, the display further includes a difference between the main and repeat logs along the depth range of the logs. An example of displaying the main and repeat logs is shown in FIG. 3A below.

In Step 203: a strict test of repeatability is performed by calculating depth log difference and cross correlation coefficient without depth shift. In one or more embodiments, the log difference and cross correlation coefficient are computed using Eqs. (1)-(3) below. For example, the cross-correlation coefficient is computed as Pearson correlation coefficient using either Eq. (2) or Eq. (3) below.

$$\text{Difference}(\%) = \frac{x_{repeat} - x_{main}}{x_{main}} \times 100\% \quad \text{Eq. (1)}$$

$$\rho_{X,Y} = \frac{\text{cov}(X,Y)}{\sigma_X \sigma_Y} = \frac{\mathbb{E}[(X-\mu_X)(Y-\mu_Y)]}{\sqrt{\mathbb{E}[(X-\mu_X)^2]}\sqrt{\mathbb{E}[(Y-\mu_Y)^2]}} \quad \text{Eq. (2)}$$

$$\rho_{X,Y} = \frac{\sum_{i=1}^{n}(x_i - \mu_X)\sum_{i=1}^{n}(y_i - \mu_Y)}{\sqrt{\sum_{i=1}^{n}(x_i - \mu_X)^2}\sqrt{\sum_{i=1}^{n}(y_i - \mu_Y)^2}} \quad \text{Eq. (3)}$$

In Eqs. (1)-(3), X is the repeat log and Y is the main log. The mean values are defined as $$\mu_X = \mathbb{E}[X] = \frac{1}{n}\sum_{i=1}^{n} x_i, \text{ and } \mu_Y = \mathbb{E}[Y] = \frac{1}{n}\sum_{i=1}^{n} y_i$$

where the subscripts correspond to depth values in the logs.

In one or more embodiments, a determination is made as to whether the computed depth log difference and cross correlation coefficient satisfy a pre-determined criterion, such as the depth log difference being less than a maximum value of 5% and the cross-correlation coefficient without depth shift exceeding a minimum value of 0.90. If the determination is positive, i.e., the main and repeat logs pass the strict test of repeatability, the method proceeds to Step 206. If the determination is negative, i.e., the main and repeat logs fail the strict test of repeatability, the method proceeds to Step 204. An example histogram and cross plot of the strict test of repeatability is shown in FIG. 3B below.

In Step 204, a lenient test of repeatability is performed by calculating bulk histogram shift and plotting cross-correlation coefficient versus depth shift. In one or more embodiments, the correlation coefficient is defined by Zero-normalized cross-correlation coefficient (ZNCC) and computed using Eq. (4) below where T represents depth shift.

$$\rho_{X,Y}(\tau) = \frac{\mathbb{E}[(X(t-\tau)-\mu_X)(Y(t)-\mu_Y)]}{\sqrt{\mathbb{E}[(X-\mu_X)^2]}\sqrt{\mathbb{E}[(Y-\mu_Y)^2]}} = \quad \text{Eq. (4)}$$

$$\frac{\sum_{i=1}^{n}(x_{i-\tau}-\mu_X)\sum_{i=1}^{n}(y_i-\mu_Y)}{\sqrt{\sum_{i=1}^{n}(x_i-\mu_X)^2}\sqrt{\sum_{i=1}^{n}(y_i-\mu_Y)^2}}$$

In addition, the optimal depth shift is computed using Eq. (5) below.

$$\tau_{max} = \underset{\tau}{\text{argmax}} \rho_{X,Y}(\tau) \quad \text{Eq. (5)}$$

Then the optimal cross correlation coefficient (i.e., optimal value of the depth shift dependent correlation coefficient) is computed using Eq. (6) below.

$$\widetilde{\rho_{X,Y}} = \rho_{X,Y}(\tau_{max}) = \frac{\sum_{i=1}^{n}(x_{i-\tau_{max}}-\mu_X)\sum_{i=1}^{n}(y_i-\mu_Y)}{\sqrt{\sum_{i=1}^{n}(x_i-\mu_X)^2}\sqrt{\sum_{i=1}^{n}(y_i-\mu_Y)^2}} \quad \text{Eq. (6)}$$

Alternatively, the correlation coefficient may also be defined by calculating the difference between main log and repeat log with alignment from phase unwrapping or dynamic warping using Eq. (7) below.

$$\rho_{X,Y}[\tau(t)] = \sum \frac{X(t-\tau(t)) - Y(t)}{Y(t)} \quad \text{Eq. (7)}$$

In Eq. (7), τ(t) is the user defined alignment algorithm where t represents depth and τ(t) represents depth shift at depth t. The summation Σ is over all valid depth (t) values.

In Eqs. (4)-(7), X is the repeat log and Y is the main log. The mean values are defined as $$\mu_X = \mathbb{E}[X] = \frac{1}{n}\sum_{i=1}^{n} x_i, \text{ and } \mu_Y = \mathbb{E}[Y] = \frac{1}{n}\sum_{i=1}^{n} y_i$$

where the subscripts correspond to depth values in the logs.

Figure 3C:
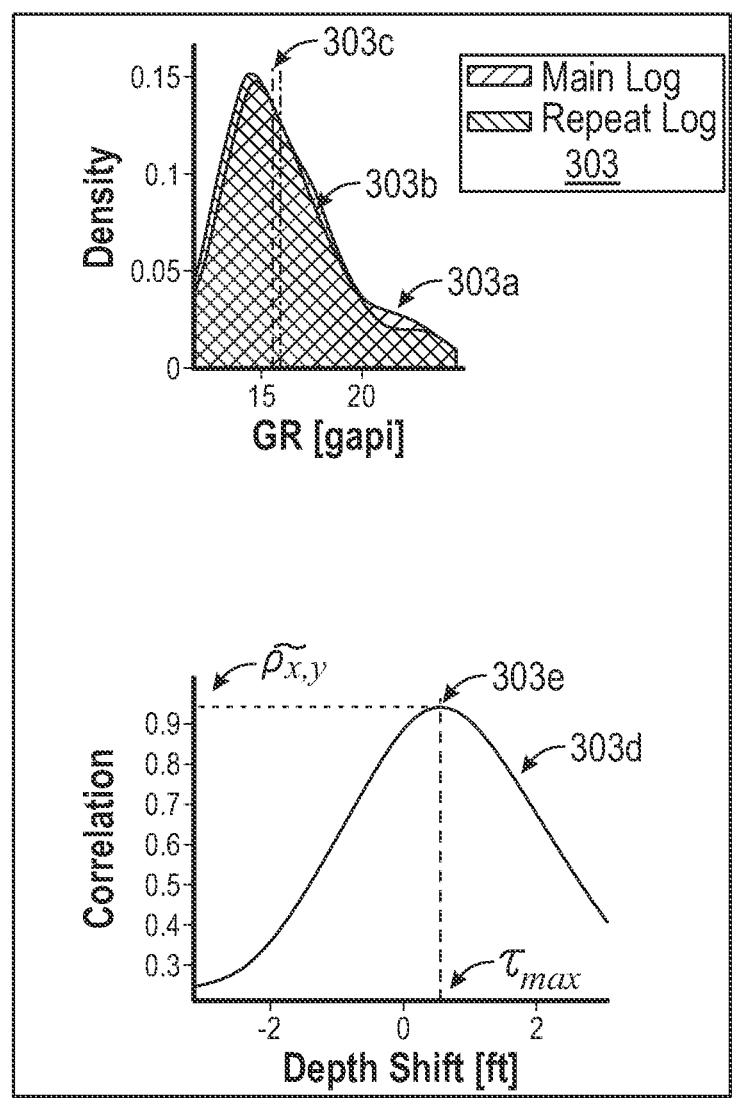

In one or more embodiments, a determination is made as to whether the computed bulk histogram shift and a depth-shift dependent cross-correlation coefficient satisfy a pre-determined criterion, such as the bulk histogram shift being less than a maximum value, such as 10% of the mean value and the depth-shift dependent cross-correlation coefficient exceeding a minimum value of 0.90. If the determination is positive, i.e., the main and repeat logs pass the lenient test of repeatability, the method proceeds to Step 206. If the determination is negative, i.e., the main and repeat logs fail the lenient test of repeatability, the method proceeds to Step 205. An example bulk histogram shift of repeat log versus main log and an example depth-shift dependent cross-correlation coefficient plot of the lenient test of repeatability are shown in FIG. 3C below.

In Step 205, a request is sent to an expert user to provide a repeatability check, when the main and repeat logs fail both the strict and lenient tests of repeatability. For example, the expert user may decide to set the repeatability check as "failed" or relax the criteria of bulk histogram shift and depth-shift dependent cross-correlation coefficient to perform both the strict and lenient tests again.

In one or more embodiments, a determination is made as to whether the main and repeat logs pass the user provided repeatability check. Whether the determination is positive or negative, i.e., whether the main and repeat logs pass or fail the user provided repeatability check, the method proceeds to Step 206 with the result of the user provided repeatability check.

In Step 206, a log repeatability summary report is generated. In one or more embodiments, the log repeatability summary report includes quantitative metrics computed using one or more of Eqs. (1)-(7) for verifying log repeatability in Step 203, Step 204, and/or Step 205. For example, the log repeatability summary report may include one or more repeatability measures, such as the repeatability PASS/FAIL status and one or more of the depth log difference, correlation coefficient without depth shift, bulk histogram, optimal depth shift, and optimal value of depth shift dependent correlation coefficient. In one or more embodiments, the log repeatability summary report is presented (e.g., displayed) to the user.

In Step 208, in response to viewing and reviewing the log repeatability summary report, the user may initiate and/or adjust a field operation associated with the main and repeat logs.

FIGS. 3A-3C show an implementation example in accordance with one or more embodiments. The implementation example shown in FIGS. 3A-3C is based on the system and method flowchart described in reference to FIGS. 1A, 1B, and 2 above. In one or more embodiments, one or more of the modules and/or elements shown in FIGS. 3A-3C may be omitted, repeated, and/or substituted. Accordingly, embodiments disclosed herein should not be considered limited to the specific arrangements of modules and/or elements shown in FIGS. 3A-3C.

In the oil & gas and mining industry, wells are drilled for both exploration and production purposes. Wells are commonly logged by lowering a combination of physical sensors (or sondes) downhole to acquire data that measures various rock and fluid properties, such as irradiation, density, electrical and acoustic properties. Well log data are archived in DLIS or LAS files as deliverables. One DLIS or LAS file may contain hundreds or thousands of data channels that are difficult to be visualized and validated manually. Furthermore, wireline logs are often acquired in one or more repeat pass(s) during a short interval to validate the main run data ensuring that the log response is repeatable under same downhole conditions, and as a quality control to verify the tool functionality and reliability. The degree that a well log can be repeated or reproduced during this short interval is used as a criteria for data quality, especially across target zones with special response, known response, log anomaly, etc.

DLIS or LAS well log data files have to pass data quality verification before going into an operating company's database. This verification process is tedious and usually takes very long time. One DLIS or LAS file may contain hundreds or thousands of data channels that are difficult to be visualized and validated manually. From time to time, multiple iterations of communication between the logging service provider and the operating company are required to achieve a final valid data deliverable. When this tedious task is performed by a human expert using a well log interpretation software, the expert needs to visualize and check all data channels one by one for its validity and repeatability before summarizing all issues in a report provided to the logging service provider as feedback before the well log files are finalized for delivering to the operating company. Furthermore, the list of data channels is often tool specific and varies significantly among different tools. Therefore, it is not efficient and not consistent to rely on human expert to complete this task.

FIGS. 3A-3C show an example of systematically tackling the issue of verifying log data repeatability in the main and repeat log data (DLIS or LAS deliverables) in an automatic and rapid manner that covers various types of log measurements. The example is based on an automated software system and workflow that allows (i) visualization of logs of both repeat and main runs, (ii) pre-defined and loaded repeatability criteria per each data channel, (iii) three levels of repeatability verification: visual test, lenient test, and strict test, and (iv) a pool of quantitative metrics of repeatability such as mean log difference, histogram shift, peak cross-correlation coefficient for measuring repeatability. For example, the automated software system and workflow reduce the time to verify repeatability of one set of DLIS files (main+repeat) that has 100 data channels from hours to just several minutes, and may be automated to process a large quantities of logs with minimal human intervention.

FIG. 3A shows an example screenshot of main log and repeat log as presented to a user for the visual test of well log repeatability. In particular, FIG. 3A shows, according to the legend (301), the plot of a main log (301a), a repeat log (301b), and difference (301c) between the main log (301a) and repeat log (301b). In particular, the main log (301a) and repeat log (301b) record gamma radiation (GR) measurements in gapi (API gamma ray unit) versus depth in ft. The difference (301c) records percentage differences versus depth. The display shown in FIG. 3A may correspond to Step 202 depicted in FIG. 2 above.

FIG. 3B shows an example display of the result of a strict test of repeatability. The display shown in FIG. 3B may generated by performing Step 203 depicted in FIG. 2 above.

In particular, FIG. 3B shows, according to the legend (302), a histogram (302a) of percentage difference between the main log (301a) and repeat log (301b). In an example scenario, the mode (i.e., most frequent occurring value) of the histogram (302a) corresponds to a main versus repeat log difference of 4%, which is less than a maximum threshold value of 5% resulting in PASS of the strict test of repeatability. In a different scenario where the maximum threshold value is defined as 3%, which is exceeded by the mode of the histogram (302a) resulting in FAIL of the strict test of repeatability.

In addition, FIG. 3B shows a cross plot (302b) of the repeat log (301b) versus the main log (301a) without considering any depth shift adjustment. In other words, the cross plot (302b) is generated using corresponding GR values of the main log (301a) and repeat log (301b) without any shifting adjustment to depth values in the main log (301a) and repeat log (301b). In an example scenario, the lines (312a, 312b, 312c) superimposing the cross plot (302b) represent the y=x line and y=x±one standard deviation lines. If more than 50% of the points are falling out of the zone between the lines (312b, 312c), the strict test fails.

FIG. 3C shows an example display of the result of a lenient test of repeatability. The display shown in FIG. 3C may generated by performing Step 204 depicted in FIG. 2 above.

In particular, FIG. 3C shows, according to the legend (303), bulk histograms (303a) and (303b) of the main log (301a) and the repeat log (301b), respectively. The vertical axis shows the probability density. The bulk histograms (303a) and (303b) show a bulk histogram shift (303c) based on the median values (i.e., middle values) of the repeat log (301b) versus the main log (301a). A large bulk histogram shift between the main and repeat logs over the same interval indicates a systematic measurement offset that might be caused by logging tool malfunction. In this case, the lenient test of repeatability fails.

FIG. 3C also shows a depth-shift dependent cross-correlation coefficient plot (303d) that is calculated using Eq. (4) above. Based on Eqs. (5)-(6), the mode (303e) of the depth-shift dependent cross-correlation coefficient plot (303d) corresponds to the optimal depth shift $\tau_{max}$ of 0.5 ft and the optimal cross correlation coefficient $\widetilde{\rho_{X,Y}}$ equal to 0.95. In other words, the cross correlation coefficient has a maximum value 0.95 when the depth shift is set to 0.5 ft in Eqs. (4)-(6). In an example scenario, the optimal cross correlation coefficient $\widetilde{\rho_{X,Y}}$ exceeds a minimum threshold value of 0.90 resulting in PASS of the lenient test of repeatability.

Embodiments disclosed herein provide a method for verifying log data repeatability in the main and repeat log data (DLIS or LAS deliverables) in an automatic and rapid manner. The python-based automated software system and workflow disclosed herein allows for visualization of logs of both repeat and main runs, pre-defined and loaded repeatability criteria per each data channel, and three levels of repeatability verification: visual test, lenient test, and strict test. A pool of quantitative metrics of repeatability such as mean log difference, histogram shift, peak cross-correlation coefficient for measuring repeatability is used to perform repeatability verification. Using embodiments disclosed herein, the time for verifying repeatability of one set of DLIS files (main+repeat) that has 100 data channels is reduced from hours to minutes.

Figure 4:
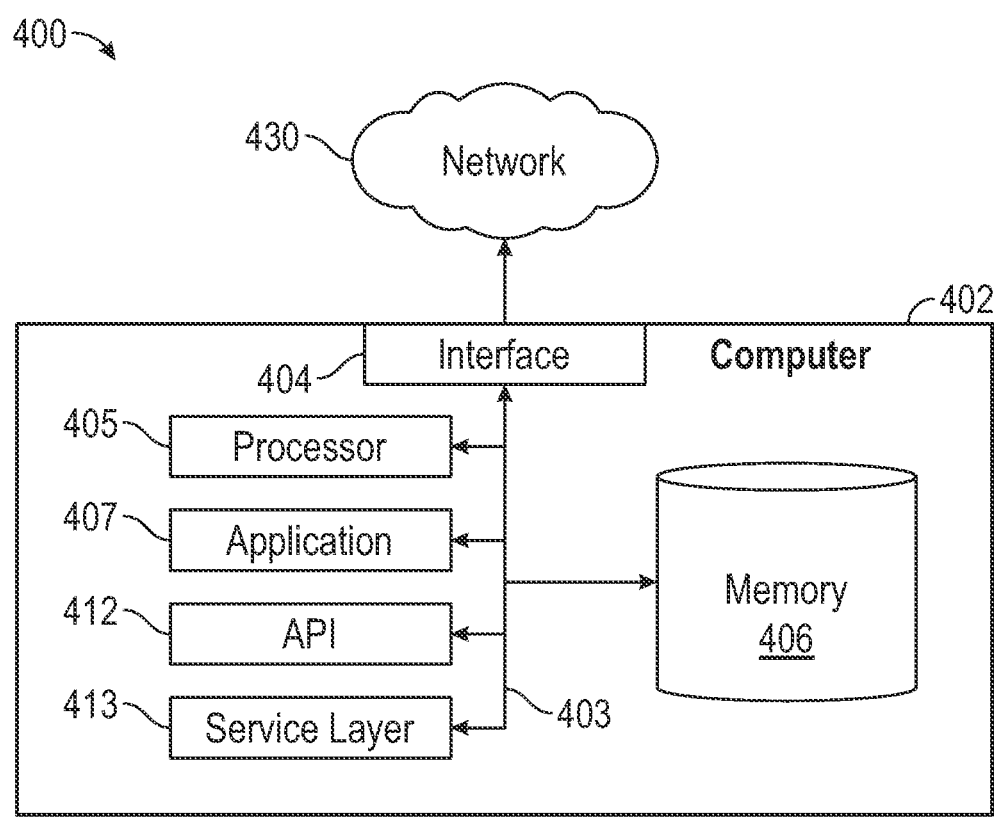
FIG. 4 shows a computing system in accordance with one or more embodiments.

Embodiments may be implemented on a computing system. FIG. 4 depicts a block diagram) of a computing system (400) including a computer (402) used to provide computational functionalities associated with described machine learning networks, algorithms, methods, functions, processes, flows, and procedures as described in this disclosure, according to one or more embodiments. The illustrated computer (402) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (402) may include a computer that includes an input device, such as a keypad, keyboard, touch screen, or other device that can accept user information, and an output device that conveys information associated with the operation of the computer (402), including digital data, visual, or audio information (or a combination of information), or a GUI.

The computer (402) can serve in a role as a client, network component, a server, a database or other persistency, or any other component (or a combination of roles) of a computer system for performing the subject matter described in the instant disclosure. The illustrated computer (402) is communicably coupled with a network (430). In some implementations, one or more components of the computer (402) may be configured to operate within environments, including cloud-computing-based, local, global, or other environment (or a combination of environments).

At a high level, the computer (402) is an electronic computing device operable to receive, transmit, process, store, or manage data and information associated with the described subject matter. According to some implementations, the computer (402) may also include or be communicably coupled with an application server, e-mail server, web server, caching server, streaming data server, business intelligence (BI) server, or other server (or a combination of servers).

The computer (402) can receive requests over network (430) from a client application (for example, executing on another computer (402)) and responding to the received requests by processing the said requests in an appropriate software application. In addition, requests may also be sent to the computer (402) from internal users (for example, from a command console or by other appropriate access method), external or third-parties, other automated applications, as well as any other appropriate entities, individuals, systems, or computers.

Each of the components of the computer (402) can communicate using a system bus (403). In some implementations, any or all of the components of the computer (402), both hardware or software (or a combination of hardware and software), may interface with each other or the interface (404) (or a combination of both) over the system bus (403) using an application programming interface (API) (412) or a service layer (413) (or a combination of the API (412) and service layer (413). The API (412) may include specifications for routines, data structures, and object classes. The API (412) may be either computer-language independent or dependent and refer to a complete interface, a single function, or even a set of APIs. The service layer (413) provides software services to the computer (402) or other components (whether or not illustrated) that are communicably coupled to the computer (402). The functionality of the computer (402) may be accessible for all service consumers using this service layer. Software services, such as those provided by the service layer (413), provide reusable, defined business functionalities through a defined interface. For example, the interface may be software written in JAVA, C++, or other suitable language providing data in extensible markup language (XML) format or another suitable format. While illustrated as an integrated component of the computer (402), alternative implementations may illustrate the API (412) or the service layer (413) as stand-alone components in relation to other components of the computer (402) or other components (whether or not illustrated) that are communicably coupled to the computer (402). Moreover, any or all parts of the API (412) or the service layer (413) may be implemented as child or sub-modules of another software module, enterprise application, or hardware module without departing from the scope of this disclosure.

The computer (402) includes an interface (404). Although illustrated as a single interface (404) in FIG. 4, two or more interfaces (404) may be used according to particular needs, desires, or particular implementations of the computer (402). The interface (404) is used by the computer (402) for communicating with other systems in a distributed environment that are connected to the network (430). Generally, the interface (404) includes logic encoded in software or hardware (or a combination of software and hardware) and operable to communicate with the network (430). More specifically, the interface (404) may include software supporting one or more communication protocols, such as the Wellsite Information Transfer Specification (WITS) protocol, associated with communications such that the network (430) or interface's hardware is operable to communicate physical signals within and outside of the illustrated computer (402).

The computer (402) includes at least one computer processor (405). Although illustrated as a single computer processor (405) in FIG. 4, two or more processors may be used according to particular needs, desires, or particular implementations of the computer (402). Generally, the computer processor (405) executes instructions and manipulates data to perform the operations of the computer (402) and any algorithms, methods, functions, processes, flows, and procedures as described in the instant disclosure.

The computer (402) also includes a memory (406) that holds data for the computer (402) or other components (or a combination of both) that can be connected to the network (430). For example, memory (406) can be a database storing data consistent with this disclosure. Although illustrated as a single memory (406) in FIG. 4, two or more memories may be used according to particular needs, desires, or particular implementations of the computer (402) and the described functionality. While memory (406) is illustrated as an integral component of the computer (402), in alternative implementations, memory (406) can be external to the computer (402).

The application (407) is an algorithmic software engine providing functionality according to particular needs, desires, or particular implementations of the computer (402), particularly with respect to functionality described in this disclosure. For example, application (407) can serve as one or more components, modules, applications, etc. Further, although illustrated as a single application (407), the application (407) may be implemented as multiple applications (407) on the computer (402). In addition, although illustrated as integral to the computer (402), in alternative implementations, the application (407) can be external to the computer (402).

There may be any number of computers (402) associated with, or external to, a computer system containing a computer (402), wherein each computer (402) communicates over network (430). Further, the term "client," "user," and other appropriate terminology may be used interchangeably as appropriate without departing from the scope of this disclosure. Moreover, this disclosure contemplates that many users may use one computer (402), or that one user may use multiple computers (402).

While the invention has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed:

1. A method to perform a field operation with well log repeatability verification, comprising:
   generating, by repeatedly performing well logging of a wellbore penetrating a subterranean formation in a field, a set of well log data files each comprising a plurality of data channels, each data channel comprising a series of measurement data records representing a downhole property along a depth in the wellbore;
   analyzing, by a computer processor, a main log and a repeat log of the set of well log data files to determine a repeatability measure of the set of well log data files;
   presenting, using a graphical user interface, the repeatability measure to a user; and
   facilitating, based on a user input in response to presenting the repeatability measure, the field operation,
   wherein analyzing the main log and the repeat log comprises:
      performing a strict test of repeatability based on a first correlation analysis of the main log and the repeat log without any depth shift adjustment,
      wherein said first correlation analysis generates, as part of the repeatability measure, a correlation coefficient without depth shift.

2. The method of claim 1, further comprising:
   obtaining, using the graphical user interface, a verification configuration file,
   wherein determining the repeatability measure of the set of well log data files is based on the verification configuration file.

3. The method of claim 1, further comprising:
   determining, by at least comparing the correlation coefficient without depth shift to a first pre-determined minimum correlation threshold, a pass status or a fail status of the strict test of repeatability,
   wherein the repeatability measure further comprises the pass status or the fail status of the strict test of repeatability.

4. The method of claim 3, wherein analyzing the main log and the repeat log further comprises:
   performing, in response to determining the fail status of the strict test of repeatability, a lenient test of repeatability based on a second correlation analysis of the main log and the repeat log with an optimal depth shift adjustment,
   wherein said second correlation analysis generates, as part of the repeatability measure, a depth shift dependent correlation coefficient.

5. The method of claim 4, further comprising:
   determining, by at least comparing the depth shift dependent correlation coefficient to a second pre-determined minimum correlation threshold, a pass status or a fail status of the lenient test of repeatability,
   wherein the repeatability measure further comprises the pass status or the fail status of the lenient test of repeatability.

6. The method of claim 4,
   wherein the optimal depth shift adjustment corresponds to an optimal value of the depth shift dependent correlation coefficient.

7. A data gathering and analysis system, comprising:
   a computer processor; and
   memory storing instructions, when executed, causing the computer processor to:
      generate, by repeatedly performing well logging of a wellbore penetrating a subterranean formation in a field, a set of well log data files each comprising a plurality of data channels, each data channel comprising a series of measurement data records representing a downhole property along a depth in the wellbore;
      analyze a main log and a repeat log of the set of well log data files to determine a repeatability measure of the set of well log data files;
      present, using a graphical user interface, the repeatability measure to a user; and
   facilitate, based on a user input in response to presenting the repeatability measure, the field operation,
   wherein analyzing the main log and the repeat log comprises:
      performing a strict test of repeatability based on a first correlation analysis of the main log and the repeat log without any depth shift adjustment,
      wherein said first correlation analysis generates, as part of the repeatability measure, a correlation coefficient without depth shift.

8. The data gathering and analysis system of claim 7, the instructions, when executed, further causing the computer processor to:
   obtain, using the graphical user interface, a verification configuration file,
   wherein determining the repeatability measure of the set of well log data files is based on the verification configuration file.

9. The data gathering and analysis system of claim 7, the instructions, when executed, further causing the computer processor to:
  determine, by at least comparing the correlation coefficient without depth shift to a first pre-determined minimum correlation threshold, a pass status or a fail status of the strict test of repeatability,
  wherein the repeatability measure further comprises the pass status or the fail status of the strict test of repeatability.

10. The data gathering and analysis system of claim 9, wherein analyzing the main log and the repeat log further comprises:
  performing, in response to determining the fail status of the strict test of repeatability, a lenient test of repeatability based on a second correlation analysis of the main log and the repeat log with an optimal depth shift adjustment,
  wherein said second correlation analysis generates, as part of the repeatability measure, a depth shift dependent correlation coefficient.

11. The data gathering and analysis system of claim 10, the instructions, when executed, further causing the computer processor to:
  determine, by at least comparing the depth shift dependent correlation coefficient to a second pre-determined minimum correlation threshold, a pass status or a fail status of the lenient test of repeatability,
  wherein the repeatability measure further comprises the pass status or the fail status of the lenient test of repeatability.

12. The data gathering and analysis system of claim 10, wherein the optimal depth shift adjustment corresponds to an optimal value of the depth shift dependent correlation coefficient.

13. A system comprising:
  a wellsite having a wellbore penetrating a subterranean formation in a field; and
  a data gathering and analysis system comprising functionality for:
  generating, by repeatedly performing well logging of a wellbore penetrating a subterranean formation in a field, a set of well log data files each comprising a plurality of data channels, each data channel comprising a series of measurement data records representing a downhole property along a depth in the wellbore;
  analyzing, by a computer processor, a main log and a repeat log of the set of well log data files to determine a repeatability measure of the set of well log data files;
  presenting, using a graphical user interface, the repeatability measure to a user; and
  facilitating, based on a user input in response to presenting the repeatability measure, the field operation,
  wherein analyzing the main log and the repeat log comprises:
    performing a strict test of repeatability based on a first correlation analysis of the main log and the repeat log without any depth shift adjustment,
    wherein said first correlation analysis generates, as part of the repeatability measure, a correlation coefficient without depth shift.

14. The system of claim 13, the data gathering and analysis system further comprising functionality for:
  obtaining, using the graphical user interface, a verification configuration file,
  wherein determining the repeatability measure of the set of well log data files is based on the verification configuration file.

15. The system of claim 13, the data gathering and analysis system further comprising functionality for:
  determining, by at least comparing the correlation coefficient without depth shift to a first pre-determined minimum correlation threshold, a pass status or a fail status of the strict test of repeatability,
  wherein the repeatability measure further comprises the pass status or the fail status of the strict test of repeatability.

16. The system of claim 15, wherein analyzing the main log and the repeat log further comprises:
  performing, in response to determining the fail status of the strict test of repeatability, a lenient test of repeatability based on a second correlation analysis of the main log and the repeat log with an optimal depth shift adjustment,
  wherein said second correlation analysis generates, as part of the repeatability measure, a depth shift dependent correlation coefficient, and
  wherein the optimal depth shift adjustment corresponds to an optimal value of the depth shift dependent correlation coefficient.

17. The system of claim 16, the data gathering and analysis system further comprising functionality for:
  determining, by at least comparing the depth shift dependent correlation coefficient to a second pre-determined minimum correlation threshold, a pass status or a fail status of the lenient test of repeatability,
  wherein the repeatability measure further comprises the pass status or the fail status of the lenient test of repeatability.

* * * * *